Figure 1:
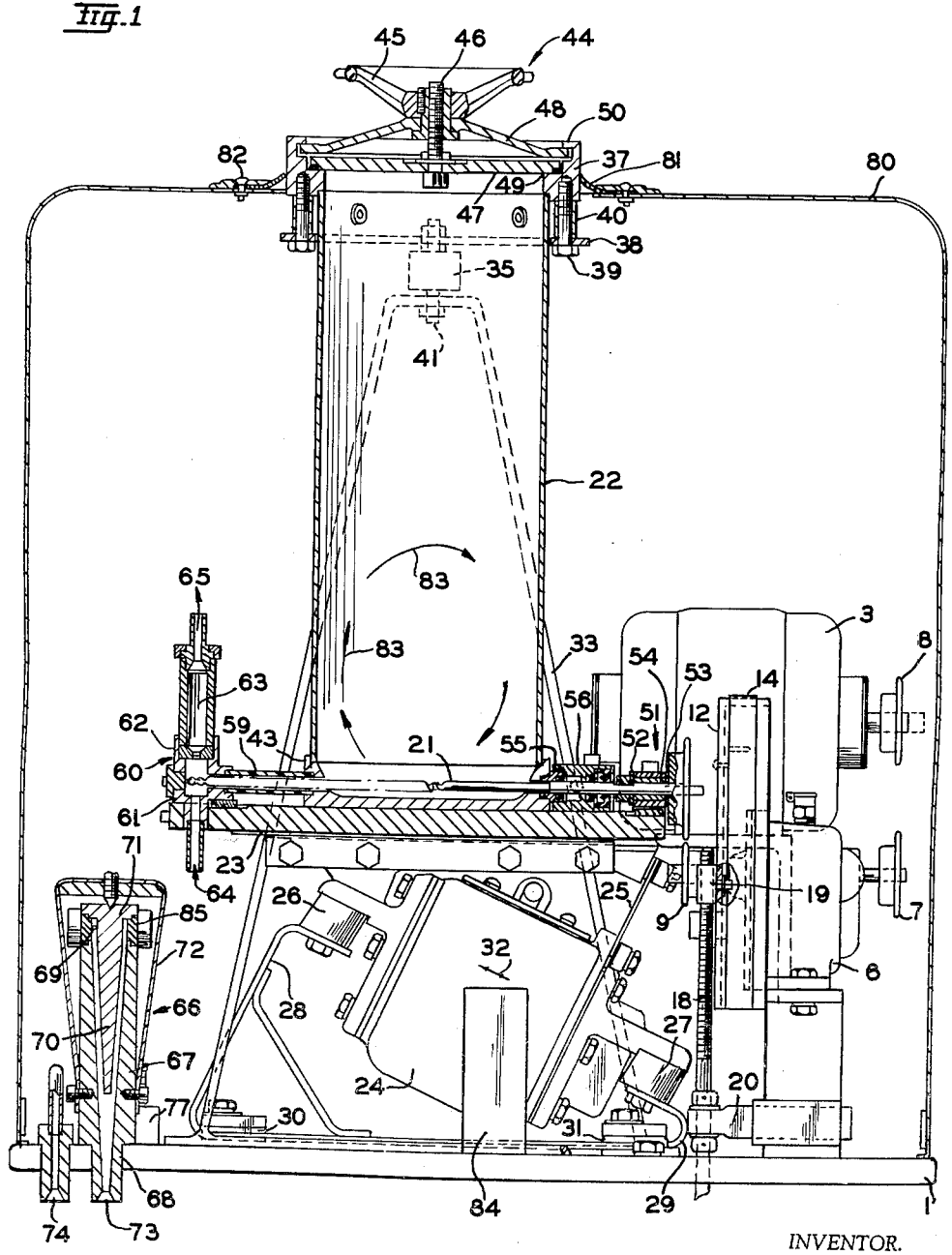

Nov. 20, 1962  G. R. SYLVESTER  3,065,032
FEED DEVICE FOR FINELY DIVIDED MATERIALS
Filed Feb. 13, 1959  2 Sheets-Sheet 1

INVENTOR.
GEORGE R. SYLVESTER
BY
Oberlin, Maky, & Donnelly
ATTORNEYS

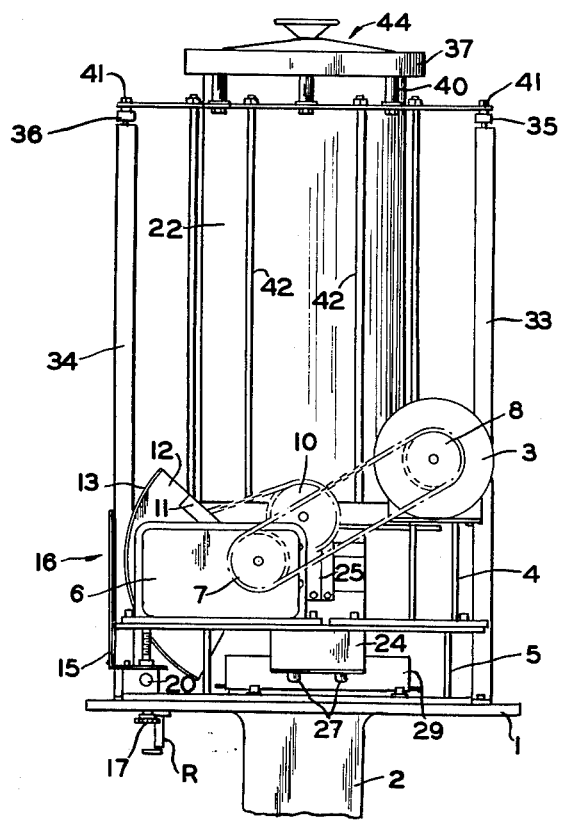

United States Patent Office 3,065,032
Patented Nov. 20, 1962

3,065,032
FEED DEVICE FOR FINELY DIVIDED
MATERIALS
George R. Sylvester, Shaker Heights, Ohio, assignor to
Sylvester & Company, Cleveland, Ohio, a corporation
of Ohio
Filed Feb. 13, 1959, Ser. No. 793,146
15 Claims. (Cl. 302—56)

This invention relates as indicated to a feed device for finely divided materials, and more particularly to apparatus in which the rate of feed of such materials may be accurately metered.

After a material has been reduced to a particle size much below 65 to 100 mesh, the particles tend to pack and agglomerate so that they no longer behave in the manner similar to liquids but act as though they were sticky or had some adhesiveness both as far as attraction to themselves as well as attraction to the container or conveyor in which they are held. In dealing with particle sizes in the neighborhood of 40 microns down to as small as fractional microns, there has always been the problem of accurately metering the rate of feed. Such particles when held within a container to drop out through a narrow opening near the bottom tend to bridge or naturally arch the opening precluding the particles from dropping through the opening.

Attempts have been made to fluidize the powdered material by means of either a gas or liquid in an effort to maintain an accurate rate of flow. However, such attempts have only resulted in erratic and totally unreliable feed devices. Moreover, such devices could not be properly used to obtain a uniform mixture of such finely divided material with either a gas stream or liquid with which it was desired to mix it. When gas was used to fluidize the material, the rate of flow was dependent upon the amount of material in the container, and moreover the gas would merely channel its way through the powder bed carrying out the fine particles and leaving the more course particles behind.

It is accordingly a principal object of my invention to provide a device that will deliver an extremely fine particulate material at a uniform predetermined rate of feed.

It is a further object of my invention to provide a device that will thoroughly mix a metered amount of an extremely fine particulate material with a gas stream.

It is a still further object of my invention to provide a packing gland for use with a device to deliver an abrasive, extremely fine particle material that will be of exceptionally long life.

It is a still further object of my invention to provide an apparatus that will greatly simplify the proper application of flame ceramic coatings.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:
FIG. 1 is an elevation partially in section of apparatus in accordance with my invention for feeding finely divided materials with parts thereof removed for clarity of illustration;
FIG. 2 is an end elevation of such apparatus on a somewhat reduced scale as seen from the right in FIG. 1 with the appearance housing and gas tubes removed; and
FIG. 3 is a schematic illustration of the gas system as used in this illustrated embodiment.

Referring now to the drawings and more particularly to FIGS. 1 and 2, it will be seen that my apparatus is mounted upon a table 1 supported upon a stand 2. On the right end of the table as viewed in FIG. 1, I support a drive motor 3 mounted upon a welded steel stand 4 which is in turn mounted as by bolts upon a stand of similar construction generally shown at 5. Mounted on the stand 5 and spaced from the stand 4 is a conventional speed reducer 6 which has a driven sprocket 7 driven from the drive sprocket 8 on the shaft of motor 3. The speed reducer 6 has a drive sprocket 9 on the opposite side thereof as seen in FIG. 2 which in turn drives the screw conveyor through driven sprocket 10 keyed to the shaft thereof.

The speed reducer is a general type of conventional speed reducer sold under the trade name of "Zero-Max" and is operated through a control handle 11 so that the conveyor sprocket 10 may be driven as for example at from 50 r.p.m. to speeds as high as 300 to 400 r.p.m. Secured to the handle 11 is an arcuate plate member 12 having an edge flange 13 lying normal thereto. Secured to the face of this edge flange as by suitable fastening means such as screws, I provide a scale 14. At the left side of the table as seen in FIG. 2, I mount a small panel 15 in which I place a window having a crosshair therein adjacent the point on the panel nearest the scale 14 as shown at 16. In this manner, the operator need only align the crosshair on the window with the desired r.p.m. reading on the scale 14 to obtain the desired speed of conveyor sprocket 10. This is accomplished by means of a hand control 17 projecting through an enlarged opening in the bottom of the table 1. This hand control rotates adjusting screw 18 which is threadedly received in collar 19 which is in turn pivotally connected to the arcuate plate 12 as shown in FIG. 1. The unthreaded shank of the screw 18 is rotatably secured in the member 20 which is in turn pivotally mounted on the stand 5. It will now be seen that a simple adjustment of the control 17 may accurately obtain a wide range of speeds for the sprocket 10 of my conveyor.

The sprocket 10 drives a screw conveyor 21 which extends through the bottom of hopper 22. The conveyor and hopper are mounted as a unit on a base 23. The base 23 is in turn mounted on an electromagnetic vibrator 24 of a conventional type which is designed to vibrate the hopper and conveyor as a unit at 60 cycles per second. The electromagnetic vibrator is connected to the back of the base by means of a tuning spring 25 by which the deflection of the hopper and conveyor may be accurately measured. The electromagnetic vibrator 24 is mounted on suitable vibration isolators 26 and 27 which are preferably made of rubber or neoprene. The vibration isolators 26 and 27 are mounted on supports 28 and 29 which are secured to the table 1 by means of suitable grommets 30 and 31, it being noted that there are two of the isolators 26 and 27 on each support. As can readily be seen in FIG. 1, the electromagnetic vibrator will vibrate generally in the directions of the arrows shown at 32 as a result of the variation in height of supports 28 and 29.

The hopper 22 is mounted on A frames 33 and 34 which are secured to the base in a suitable manner. At the apices of the A frames are two vibration isolators 35 and 36 of a construction similar to that of isolators 26 and 27. The top of the hopper 22 comprises enlarged flange member 37 having dependently mounted therearound a reinforcing flange 38 suitably spaced from and fastened thereto by means of bolts 39 passing through sleeves 40. The isolators 35 and 36 are suitably secured to the flange 38 as by means of bolts 41.

Extending between the flange 38 which is firmly secured to the top flange 37 of the hopper 22 and the base 23 are suitable tie rods 42. These tie rods firmly hold the top flange 37 on the cylindrical hopper 22 as well as the hopper 22 on base member 43, a suitable sealant being employed at the juncture of these members to keep the hopper air tight. Within the top 37 of the hopper 22 I place a more or less conventional cover generally shown at 44 which may be used to seal the hopper 22 from atmosphere. The cover 44 comprises a hand wheel 45 which turns a central threaded member 56 forcibly to space the sealing plate 47 from the top of the cover 48. In the spaced position, the sealing cover will abut or press down against shoulder 49 in the top 37 of the hopper. The cover may be opened by turning the hand wheel 45 to draw the sealing plate 47 up against the top of the cover 48 and then rotating the cover as a unit to move it from beneath spaced flanges 50 in the top of the member 37.

It will now be seen that the conveyor 21 and the hopper 22 are mounted as a unit on the base 23 for vibration by the electromagnetic vibrator 24 through suitable vibration isolators 26, 27, 35 and 36. It will be noted that the vibrations will not be transferred to the power unit or to the table, the flexible chain between sprockets 9 and 10 absorbing the vibrations to the power unit.

The screw conveyor 21 has a drive bearing generally shown at 51 which comprises two axial thrust bearings 52 and 53 abutting against a key member and sprocket wheel 10 which are keyed on the shaft, and a radial thrust bearing 54 therebetween. These bearings are preferably of the porous metal type which are permanently lubricated by saturation in a suitable lubricant and are generally sold under the trademark "Oilite." The shaft of the screw conveyor 21 extends into the base 43 of the hopper through a packing gland generally shown at 55. The static packing gland is composed of suitable O-rings which seal the hopper 22 from atmosphere around the shaft of the screw conveyor 21. On the side of the gland away from the hopper 22 I provide a housing 56 enclosing the outside of the gland which has suitable sealing rings utilizing V or U-cup packings enclosing the shaft of the conveyor 21, the packing nearest the drive bearing being a U-cup packing utilizing a garter spring to hold it against the shaft. In this manner, the housing 56 provides a sealed chamber for the side of the packing gland away from the hopper 22. As seen in FIG. 3 the chamber 56 has a gas inlet 57 and a restricted orifice gas outlet 58 which constitute a means to pressurize the chamber 56.

The feed end of the conveyor 21 extends outwardly through a sleeve 59 into a carburetor generally shown at 60. The tip of the screw conveyor 21 extends partially through a lower initial mixing chamber 61 therein. It will now be seen that through rotation of screw conveyor 21 the material within hopper 22 will be fed through sleeve 59 into the chamber 61 of the carburetor 60. Vertically spaced above the chamber 61 is a restricted orifice 62 which leads into an enlarged mixing chamber 63. It will now be seen that gas entering through the inlet 64 of the carburetor 60 will pass into the initial feed chamber 61 and issue vertically at a high velocity through the restricted orifice 62. Eddy currents within the chamber 61 will more thoroughly mix the gas and the powdered material and then the mixture will pass outwardly through outlet 65. The parts of the carburetor are preferably made of very durable abrasion resistant metal as, for example, brass or bronze. Inlet and outlet 64 and 65 respectively are conventionally circumferentially ridged to facilitate flexible tubing being clamped thereto.

The mixing chamber 63 of the carburetor 60 is extremely important in that it will reduce pulsations in the gas stream which result from the rotation of the screw conveyor 21 extending into chamber 61. These pulsations can be eliminated by the use of this chamber and the result is, of course, more uniformity in the mixture of the particles and the gas stream. It is noted that the carburetor is mounted on the conveyor-hopper unit and will of course also be kept in vibration to preclude the material from adhering to the parts thereof.

After the gas issues from the outlet 65, it may be fed by such tubing into my cyclone mixer generally shown at 66. The cyclone mixer comprises an enclosure 67 having a conical chamber 68 therein. At the top of the conical chamber is a tangential inlet 69 which is connected to the outlet 65 of the carburetor. The gas containing the mixture of finely divided material will enter through the tangential inlet 69 and tend to swirl within the conical chamber 68. To preclude the device from acting as a cyclone separator, I prefer to provide a conical core 70 which is closely spaced from the walls of the chamber 68 to keep the gas and powder mixture traveling in a path adjacent the walls of the chamber where it will have a maximum velocity. The core 70 may preferably be a central protrusion on a cover 71 for the chamber 68 which may be tightly held thereon by means of clamps 72. Adjacent the outlet 73 of the cyclone mixer 66, I provide a suitable outlet 74 that may be used as a source of hydrogen in conjunction with outlet 73 to feed an oxy-hydrogen torch, it being understood that the gas passing through the carburetor is oxygen. As the result of my feeding and mixing apparatus, the gas emerging from the outlet 73 of the mixer will have a very constant amount of fine powder entrained therein.

Referring to FIG. 3, it will be seen that the oxygen or other suitable gas may enter from a source 75 under for example approximately 5 pounds of pressure. The gas passes into the chamber 56 enclosing my packing gland 55 and issues therefrom through restricted orifice 58 into conduit 76 which leads to a T coupling 77. From this coupling the gas passes upwardly through conduit 78 and through carburetor 60. From there it passes to the cyclone mixer 66. Gas is also free to pass from the T coupling 77 to the top of the hopper 22 through conduit 79. Also connected to the top of the hopper is a relief valve R which may have a conventional toggle operated lever to act as a manual bleed valve for the hopper. The relief valve R may preferably be mounted beneath the table 1 and connected to the top of the hopper by flexible tubing.

The pressures within conduits 76, 78, 79 and the hopper 22 are approximately 4 pounds per square inch. It will now been seen that where an extremely abrasive material is being handled, the higher pressure will be upon the side of the packing gland 55 away from the hopper 22. This will preclude the material from becoming lodged between the O-rings and the shaft of the screw conveyor 21. In other words, all gas leaks through the packing gland will be in the directon of the hopper 22 thus keeping the abrasive material away from the packing gland. Without the pressurized packing gland, the life of O-rings or the like as well as the shaft of the screw conveyor 21 would be greatly reduced as the result of the abrasive action of the powder.

Covering the entire device and resting on the edges of the table is an appearance housing 80 having a flexible annular flange 81 secured thereto as by screws 82 surrounding the top 37 of the hopper. This flexible flange 81 will preclude the transmission of any vibrations from the hopper 22 to the table 1 through the appearance housing 80.

Since the very fine material being handled can be extremely abrasive, I prefer to use as a material for my conduits such as 76, 78 and 79 as well as conveyor sleeve 59, a vinyl chloride or preferably a polyvinyl chloride-acetate. A tubing employing this type of material may be obtained on the market under the trade name of "Tygon." This type of tubing is extremely flexible and yet quite resistant to oxygen as well as the abrasive material.

The screw conveyor 21 may preferably be approximately a ¼ inch diameter rod of extremely wear resistant material as for example "Monel" metal, the screw of which originates at a point approximately halfway across the hopper and terminates in the interior of the chamber 61 of the carburetor. The pitch of the screw, of course, may be varied so that it is possible to vary the feeding range as desired. It is easily possible to reduce the feed which will still remain uniform to a rate as low as .05 pound per hour when a suitable pitch screw is installed. The rate of feed may vary anywhere from .4 pound per hour to as high as 2.5 pounds per hour of a material such as aluminum oxide when using the proper pitch screw. Heavier powders such as zirconium oxide, of course, may be fed at equal volumetric rate but much greater gravimetric rates.

The electromagnetic vibrator vibrating generally in the direction shown by arrows 32 will cause the material within hopper 22 to tumble or circulate in the manner shown by the arrows 83 in FIG. 1. In this manner, the powder will be continually moving in a circular direction, this path of movement lying in the same plane as the axis of conveyor 21. As a result, the powder will not bridge or arch over the screw conveyor and the screw will not channel or cut a circular opening within the bulk of the powder itself. Moreover, a proper proportion of fine and course material will be fed into the conveyor whereas conventional vibrating actions tend to separate the fine and course materials. A suitable tie board 84 as shown in FIG. 1 may be employed for the attachment of the electrical circuits, 60 cycle, 117 volt alternating current being sufficient to operate the electromagnetic vibrator 23 as well as the motor 3.

Due to the extreme abrasiveness of certain of the powders being used, I prefer to employ an abrasion resistant material generally shown at 85 in the zone of tangential inlet 69 of my cyclone mixer 66. This material may be for example a hardened stainless steel, a fused or sintered alluminum oxide, or a tungsten or titanium carbide. While this added zone of protection may be omitted, it will result in a longer life for the cyclone mixer when such extremely abrasive materials are being used.

While the unit illustarted was designed particularly to be used with an oxy-hydrogen torch for the application of flame ceramic coatings wherein a powdered ceramic material is conveyod through the flame by means of the oxygen stream, the apparatus, of course, has many other valuable uses as for example as an extremely accurate feeder for feeding powders into other gas streams or into liquids wherein the amounts and rate of feed thereof are extremely important.

It will now be seen that I have provided a device that will deliver uniformly an extremely fine particulate material and, moreover, will greatly simplify the proper metered application of flame ceramic coatings.

Other modes of applying the principle of the invention may be employed, change being made as regards the details described, provided the features stated in any of the following claims or the equivalent of such be employed.

I therefore particularly point out and distinctly claim as my invention:

1. A feed device for finely divided materials comprising a support, a hopper for such finely divided material, a metering screw conveyor having a feed end and a drive end extending transversely of said hopper at the bottom thereof, vibrating means to vibrate the hopper and conveyor, means mounting said hopper and conveyor as a unit for such vibration with respect to said support, and variable speed drive means for said metering screw conveyor selectively to vary the amount of finely divided material fed from said hopper.

2. The feed device of claim 1 wherein said hopper is sealed to the atmosphere and pressurized.

3. The feed device of claim 2 including a bearing for the drive end of said metering screw conveyor spaced from said hopper, a packing gland interposed between said bearing and said hopper, and means to pressurize the side of said packing gland away from said hopper at a pressure always higher than that of the hopper regardless of the pressure in said hopper.

4. The feed device of claim 2 including a packing gland sealing the pressurized hopper from the atmosphere where the drive end of the screw conveyor enters the hopper, and means to pressurize the drive side of said packing gland at a pressure always higher than that of the hopper.

5. The feed device of claim 1 including a packing gland sealing the hopper from the atmosphere where the drive end of the metering screw enters the hopper, means to pressurize said hopper, and means to apply a higher than hopper pressure to the side of said packing gland away from the hopper.

6. The feed device of claim 1 including a carburetor on the feed end of said metering screw conveyor to mix the finely divided material with a gas.

7. The feed device of claim 1 wherein the finely divided material within the hopper is tumbled by the vibrating means to move in a direction generally toward the feed end of the metering screw conveyor.

8. A feed device for feeding finely divided materials into gas streams comprising an atmospherically sealed hopper for such finely divided material, a screw conveyor having a feed end and a drive end extending transversely of said hopper at the bottom thereof, means to rapidly vibrate the hopper and conveyor as a unit, a packing gland sealing the hopper where the drive end of the conveyor enters the hopper, a chamber enclosing the side of said packing gland away from the hopper, a source of gas under pressure connected directly to said chamber, an outlet from said chamber having a restricted orifice connected to said sealed hopper and to a carburetor enclosing the feed end of said screw conveyor, an outlet from said carburetor connected to a cyclone mixer and an outlet from said cyclone mixer.

9. A feed device as set forth in claim 8 including variable speed drive means for said screw conveyor selectively to vary the amount of finely divided material fed into such gas stream.

10. A feed device as set forth in claim 8 wherein said cyclone mixer comprises an enclosure defining a funnel shaped mixing chamber, a tangential inlet from said carburetor adjacent the enlarged end of said chamber, and a cover for said enclosure having a conical protrusion closely fitting but spaced from the funnel shaped mixing chamber.

11. A feed device as set forth in claim 8 wherein said carburetor comprises an elongated vertical chamber having a lateral opening for said screw conveyor.

12. A cyclone mixer for mixing finely divided particles into gas streams comprising an enclosure defining an elongated funnel shaped chamber therein, a tangential inlet adjacent the enlarged end of said chamber for a gas stream containing finely divided particles, and a conical core for said enclosure closely fitting but spaced somewhat from said funnel shaped chamber to limit the gas travel to the periphery of said chamber.

13. A cyclone mixer as set forth in claim 12 wherein said conical core is a central protrusion from a cover for the enlarged end of said chamber.

14. A cyclone mixer as set forth in claim 13 wherein the material of said enclosure in the zone of said inlet is an abrasion resistant material.

15. A feed device for finely divided materials comprising a support, a hopper for such finely divided material, a metering power driven conveyor having a feed end and a drive end extending transversely of said hopper at the bottom thereof, vibrating means to vibrate the hopper and conveyor as a unit means mounting said hopper and conveyor for such unitary vibration with respect to said support, and variable speed drive means for said metering conveyor accurately to increase or decrease the amount of finely divided material fed from said hopper to obtain a selected rate of feed and to maintain the thus selected feed rate constant.

References Cited in the file of this patent

UNITED STATES PATENTS

| | | |
|---|---|---|
| 1,324,930 | Schaffer | Dec. 16, 1919 |
| 1,495,479 | Grindle | May 27, 1924 |
| 1,941,572 | Morrow | Jan. 2, 1934 |
| 1,979,176 | Schicht | Oct. 30, 1934 |
| 2,343,163 | Vose | Feb. 29, 1944 |
| 2,448,745 | Struckmann | Sept. 7, 1948 |
| 2,470,819 | Hughey | May 24, 1949 |
| 2,549,033 | Tyrner | Apr. 17, 1951 |
| 2,738,234 | Anderson | Mar. 13, 1956 |